United States Patent
Rennig et al.

(10) Patent No.: US 12,526,169 B2
(45) Date of Patent: Jan. 13, 2026

(54) VEHICLE COMMUNICATION NETWORK

(71) Applicants: STMicroelectronics S.r.l., Agrate Brianza (IT); STMicroelectronics Application GmbH, Aschheim-Dornach (DE); STMicroelectronics (Alps) SAS, Grenoble (FR)

(72) Inventors: Fred Rennig, Nandlstadt (DE); Giovanni Luca Torrisi, Catania (IT); Manuel Gaertner, Feldkirchen (DE); Philippe Sirito-Olivier, Martigues (FR); Fritz Burkhardt, Munich (DE); Aldo Occhipinti, Catania (IT)

(73) Assignees: STMicroelectronics (ALPS) SAS, Grenoble (FR); STMicroelectronics Application GMBH, Aschheim-Dornach (DE); STMicroelectronics S.R.L., Agrate Brianza (IT)

( * ) Notice: Subject to any disclaimer, the term of this patent is extended or adjusted under 35 U.S.C. 154(b) by 224 days.

(21) Appl. No.: 18/509,618

(22) Filed: Nov. 15, 2023

(65) Prior Publication Data
US 2024/0171424 A1 May 23, 2024

(30) Foreign Application Priority Data
Nov. 22, 2022 (IT) .......................... 102022000023982

(51) Int. Cl.
*H04L 12/40* (2006.01)
(52) U.S. Cl.
CPC .................. *H04L 12/40006* (2013.01); *H04L 2012/40215* (2013.01)

(58) Field of Classification Search
CPC ... H04L 12/40; H04L 12/40039; H04L 12/12; H04L 2012/40215; H04L 2012/40273; H04L 67/125
See application file for complete search history.

(56) References Cited

U.S. PATENT DOCUMENTS

| | | | |
|---|---|---|---|
| 2018/0141439 A1* | 5/2018 | Shin ...................... | B60L 3/0084 |
| 2022/0086021 A1* | 3/2022 | Philippe ............ | H04L 12/40169 |

(Continued)

FOREIGN PATENT DOCUMENTS

EP 3761568 A1 1/2021

OTHER PUBLICATIONS

Askaripoor, H., et al., "E/E Architecture Synthesis: Challenges and Technologies," Electronics 2022, vol. 11, No. 4, https://doi.org/10.3390/electronics11040518, Feb. 10, 2022, 26 pages.

(Continued)

*Primary Examiner* — Rasheed Gidado
(74) *Attorney, Agent, or Firm* — Slater Matsil, LLP

(57) ABSTRACT

A vehicle communication network includes electronic control units arranged in a plurality of groups. The electronic control units pertaining to the same group are coupled to each other via a respective dedicated communication bus. A central controller is coupled to the plurality of local controllers. Electrical loads are coupled to one of the electronic control units. Each of the electronic control units is configured to decode the received CAN frame to produce the actuation signal for a respective electrical load in response to a CAN frame being received from the respective local controller and transmit a CAN wake-up frame to the respective local controller and encode the feedback signal into a CAN frame for transmission to the respective local controller in response to the feedback signal being received from the respective electrical load.

24 Claims, 5 Drawing Sheets

(56) References Cited

U.S. PATENT DOCUMENTS

2022/0141051 A1* 5/2022 Miyoshi ................. H04B 3/36
            709/224
2022/0242367 A1  8/2022 Kato et al.
2023/0196848 A1* 6/2023 Tomimatsu ............ H04L 12/40
            701/31.4

OTHER PUBLICATIONS

International Standard, "Road Vehicles—Controller area network (CAN)—Part 2: High-speed medium access unit," Reference No. ISO 11898-2, Second edition, Dec. 15, 2016, 38 pages.

Bandur, V., et al., "Making the Case for Centralized Automotive E/E Architectures," IEEE Transactions on Vehicular Technology, vol. 70, No. 2, Feb. 2021, 16 pages.

Haeberle, M., et al., "Softwarization of Automotive E/E Architectures: A Software-Defined Networking Approach," 2020 IEEE Vehicular Networking Conference (VNC), New York, NY, USA, Dec. 16-18, 2020, 8 pages.

Herber, C., et al., "Spatial and Temporal Isolation of Virtual CAN Controllers," SIGBED Review, vol. 11, No. 2, Jun. 2014, 8 pages.

* cited by examiner

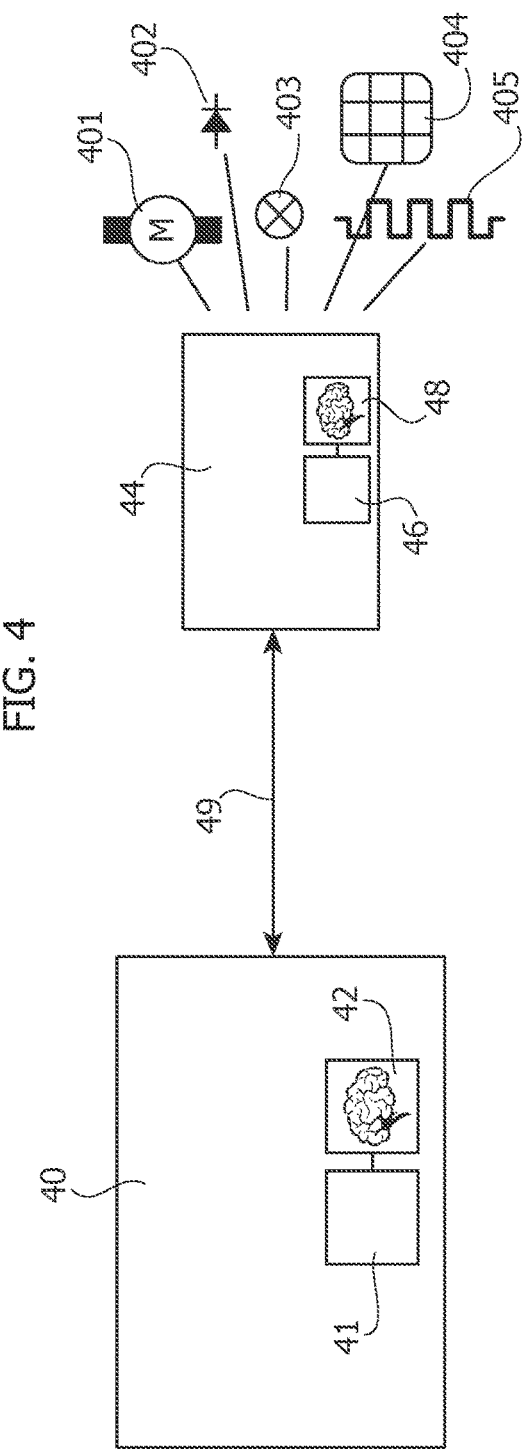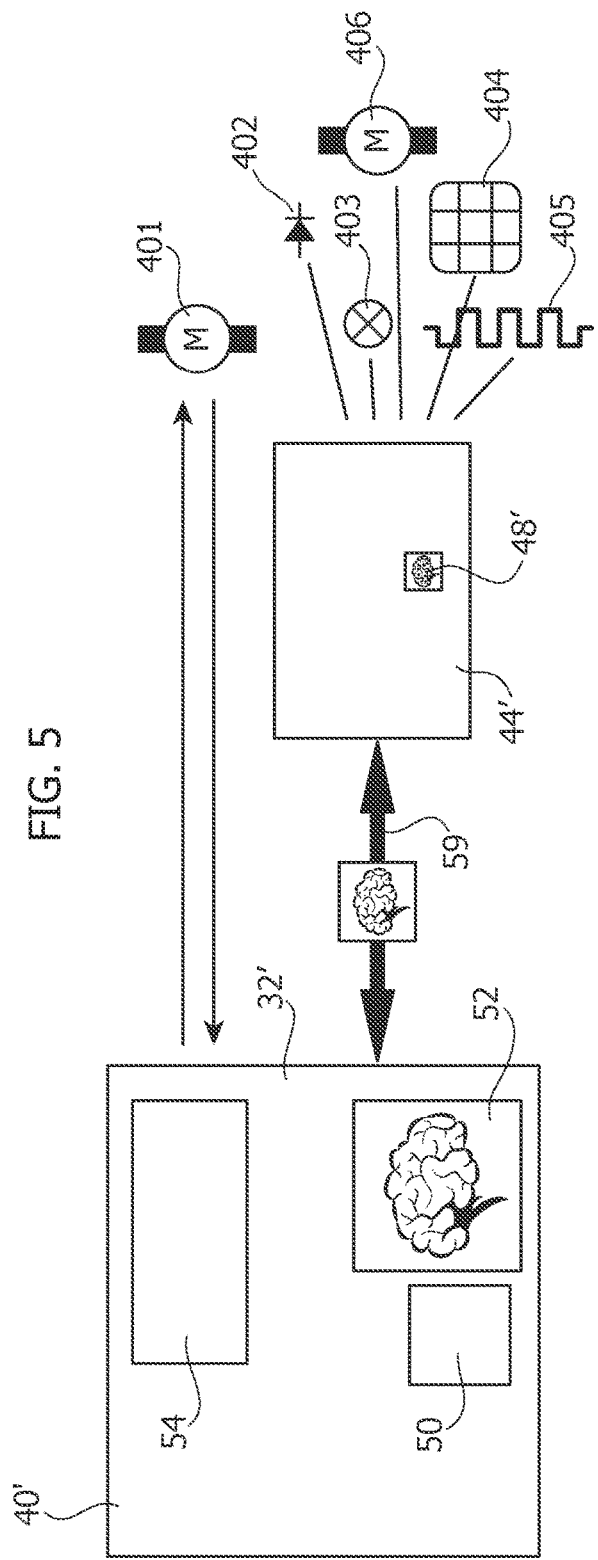

VEHICLE COMMUNICATION NETWORK

CROSS-REFERENCE TO RELATED APPLICATIONS

This application is a translation of and claims the priority benefit of Italian patent application number 102022000023982, filed on Nov. 22, 2022, entitled "Vehicle communication network" which is hereby incorporated by reference to the maximum extent allowable by law.

TECHNICAL FIELD

The description relates to a vehicle communication network.

BACKGROUND

The electrical and electronic (E/E) architecture of vehicles has been evolving significantly in recent years. Document V. Bandur, G. Selim, V. Pantelic and M. Lawford, "Making the Case for Centralized Automotive E/E Architectures," in IEEE Transactions on Vehicular Technology, vol. 70, no. 2, pp. 1230-1245, February 2021, doi: 10.1109/TVT.2021.3054934 provides an overview of such a technological trend. Similarly, document H. Askaripoor, M. Hashemi Farzaneh and A. Knoll, "E/E Architecture Synthesis: Challenges and Technologies," in Electronics 2022, 11(4), 518, doi: 10.3390/electronics11040518 is exemplary of the prior art in this field.

Substantially, the E/E architecture of vehicles has changed over the years from a flat or distributed architecture (as exemplified in the communication network scheme of FIG. 1) to a domain-oriented architecture (as exemplified in the communication network scheme of FIG. 2), and is now shifting towards a zone-oriented architecture (as exemplified in the communication network scheme of FIG. 3). The main factors that drive the evolution of the E/E architecture are: the evolution of computation power (increasing computation power leads to consolidation; application separation by hardware hypervisor); the evolution of the car network (high bandwidth networks connect processors); the evolution of the architecture (increased computation power and high bandwidth interconnects shape the car architecture towards domain-oriented and zone-oriented architecture); and the willingness for a reduction of the Total Cost of Ownership (TCO) without degradation of overall performance.

As exemplified in FIG. 1, a flat E/E network of a vehicle V includes a plurality of electronic control units (ECUs) positioned at different locations of the vehicle and coupled to each other via a communication network (bus) and, optionally, a central gateway 10. Each of the ECUs includes a processing unit or driver units and carries out respective operations (e.g., sensing from sensors or actuating actuators).

As exemplified in FIG. 2, a domain-oriented E/E network of a vehicle V also includes a plurality of electronic control units (ECUs) positioned at different locations of the vehicle. The various ECUs are logically (and not necessarily physically) grouped in different groups (or domains) of ECUs, where the ECUs pertaining to the same group carry out operations relating to the same domain of functions. For instance, ECUs in a first group 20a may be configured to control the drivetrain functions, ECUs in a second group 20b may be configured to control the connectivity functions, ECUs in a third group 20c may be configured to control the infotainment functions, ECUs in a fourth group 20d may be configured to control the functions related to advanced driver assistance systems (ADAS) or autonomous driving (AD) systems, and ECUs in a fifth group 20e may be configured to control the body and comfort functions.

The ECUs in the same group (or domain) are coupled to each other via a dedicated network that is coupled to a respective domain controller (e.g., a drivetrain controller 22a for domain 20a, a connectivity controller 22b for domain 20b, an infotainment controller 22c for domain 20c, an ADAS/AD controller 22d for domain 20d, and a body/comfort controller 22e for domain 20e). The domain controllers are coupled to each other via a central gateway 24 for exchanging signals (e.g., data). Since the ECUs pertaining to the same domain may be physically distributed at different locations of the vehicle V (e.g., an ECU managing a front camera may be located at the front of the vehicle, and an ECU managing a rear camera may be located at the rear of the vehicle), the communication network of each domain may turn out to be complicated and involve a complex or costly harness.

As exemplified in FIG. 3, a zone-oriented E/E network of a vehicle V also includes a plurality of electronic control units (ECUs) positioned at different locations of the vehicle. The various ECUs are physically grouped in different groups (or clouds) of ECUs, and the ECUs pertaining to the same group are physically located in a given region or zone of the vehicle V. For instance, ECUs in a first group 30a may be located in the front left area of vehicle V, ECUs in a second group 30b may be located in the front right area of vehicle V, ECUs in a third group 30c may be located in the rear right area of vehicle V, and ECUs in a fourth group 30d may be located in the rear left area of vehicle V.

The ECUs in the same group may perform functions relating to different domains, e.g., each of groups 30a to 30d may include different ECUs that control the drivetrain functions, the connectivity functions, the infotainment functions, the ADAS/AD functions, the body/comfort functions, and so on. The ECUs in the same group are coupled to each other via a dedicated zonal network (possibly with the ECUs pertaining to different domains being arranged and coupled via dedicated sub-networks, as exemplified in FIG. 3). Each zonal network is coupled to a respective zonal gateway or zonal controller (e.g., a front left gateway 32a for zone 30a, a front right gateway 32b for zone 30b, a rear right gateway 32c for zone 30c, and a rear left gateway 32d for zone 30d). The zonal controllers are coupled to each other via a central control unit 34 (or plural central control units).

In order to enable many of the functions available in modern vehicles (e.g., front and rear lighting effects, door zone functions, power trunk, etc.) the electronic communication relies on the provision of microcontrollers (MCU) and software for high dynamics and safety. In particular, the microcontrollers may be located close to the respective drivers (e.g., a microcontroller may be provided in each of the ECUs in each of groups 20a to 20e or groups 30a to 30d), as well as in the domain controllers 22a to 22e or the zonal controllers 32a to 32d. This may result in a complex network topology or a high cost.

SUMMARY

One or more embodiments relate to a bus architecture based on a CAN FD protocol for use in the automotive field, and to devices configured to operate in such a CAN FD bus architecture.

There is a need in the art to provide improved communication networks (e.g., improved E/E architectures) in the automotive sector, as well as improved controller devices and satellite devices suitable to operate in such improved networks. In particular, such improved communication networks, controller devices and satellite devices may rely on a CAN protocol, particularly a CAN FD protocol, more particularly a CAN FD Light protocol, as described in the Draft Specification Proposal (DSP) CiA 604-1 CAN FD Light specification. One or more embodiments contribute in providing such improved automotive communication networks, controller devices or satellite devices.

In one or more embodiments, a vehicle communication network includes a plurality of electronic control units (ECUs) arranged in a plurality of groups. The ECUs pertaining to the same group are coupled to each other via a respective dedicated communication bus operated according to a CAN protocol. The network includes a plurality of local controllers, each including a microcontroller unit and being coupled to a respective one of the groups of ECUs via the respective dedicated communication bus to exchange CAN frames therewith. The network includes a central controller coupled to the plurality of local controllers via a vehicle communication bus. The network includes a first set of electrical loads, each coupled to one of the electronic control units to receive an actuation signal therefrom or provide a feedback signal thereto. Each microcontroller unit of the local controllers is configured as communication commander device to transmit and receive CAN frames via the respective dedicated communication bus. Each of the ECUs includes a respective logic circuit configured as communication responder device. In response to a CAN frame being received from the respective local controller, the logic circuit decodes the received CAN frame to produce the actuation signal for a respective electrical load. In response to a feedback signal being received from the respective electrical load, the logic circuit transmits a CAN wake-up frame to the respective local controller and encodes the feedback signal into a CAN frame for transmission to the respective local controller.

One or more embodiments may thus provide an automotive communication network where most of the signal processing is performed by the local controllers, and where the ECUs exchange CAN frames with the local controllers according to a commander-responder scheme but are able to wake up the CAN bus to start the communication.

BRIEF DESCRIPTION OF THE DRAWINGS

One or more embodiments will now be described, by way of example only, with reference to the annexed figures, wherein:

FIG. 4 is a block diagram exemplary of the arrangement of a zonal controller and a satellite device in a communication network having a zone-oriented architecture;

FIG. 5 is a block diagram exemplary of the arrangement of a zonal controller and a satellite device in a communication network having a zone-oriented architecture, according to one or more embodiments of the present description;

DETAILED DESCRIPTION OF EMBODIMENTS

Figure 2:
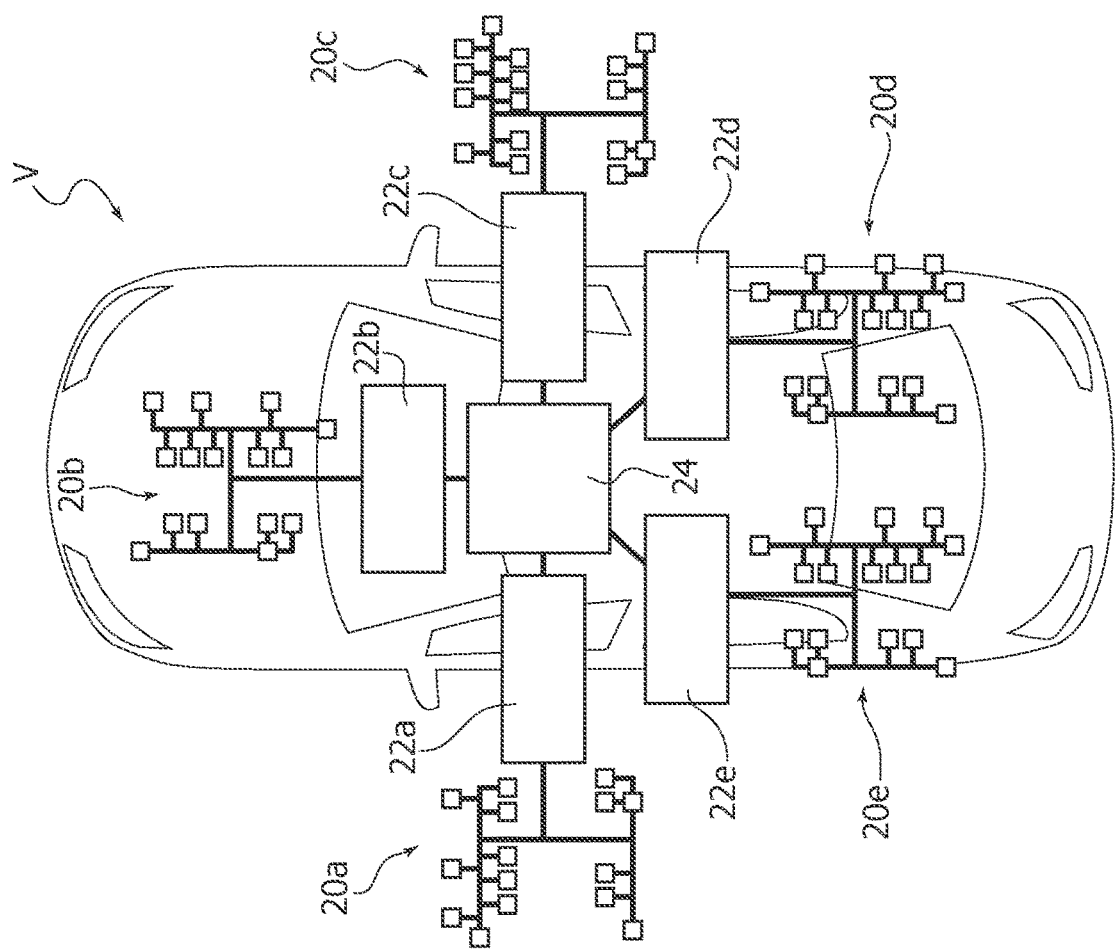
FIG. 2 is a simplified scheme exemplary of an automotive communication network having a domain-oriented architecture.
Figure 1:
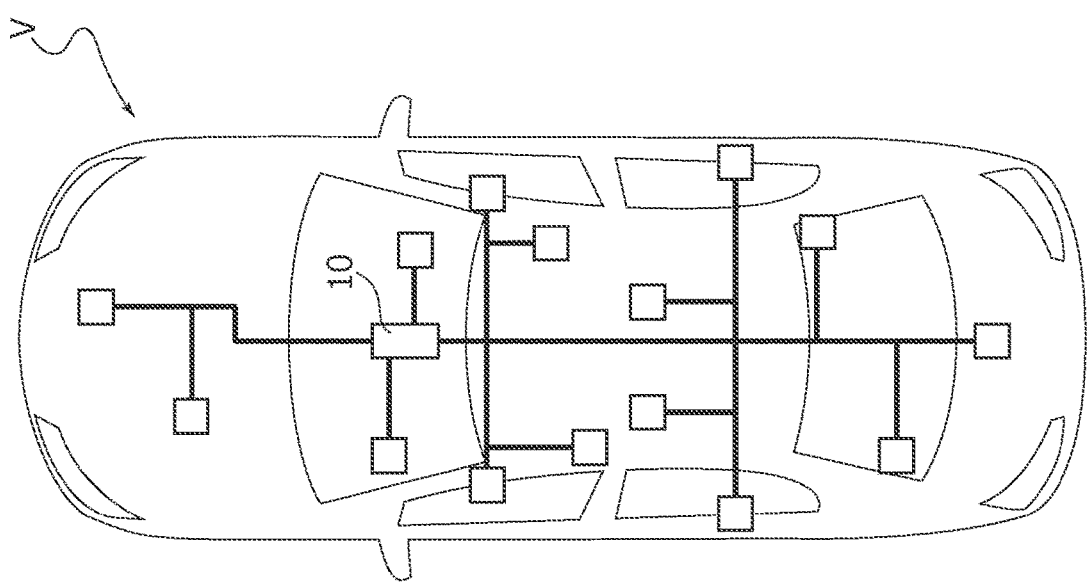
FIG. 1 is a simplified scheme exemplary of an automotive communication network having a flat architecture.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

As previously discussed with reference to FIGS. 2 and 3, in certain domain-oriented or zone-oriented automotive E/E architectures, programmable "intelligence" (e.g., programmable processing circuitry) is redundantly available in the vehicle's domain or zonal controllers as well as in the satellite ECUs. FIG. 4 is a block diagram exemplary of such a configuration: a domain or zonal controller 40 includes a microcontroller 41 (MCU or μC) that runs a program or application 42 (e.g., a firmware or embedded software), and each satellite ECU 44 includes a microcontroller 46 that runs a program or application 48 (e.g., a firmware or embedded software).

Figure 3:
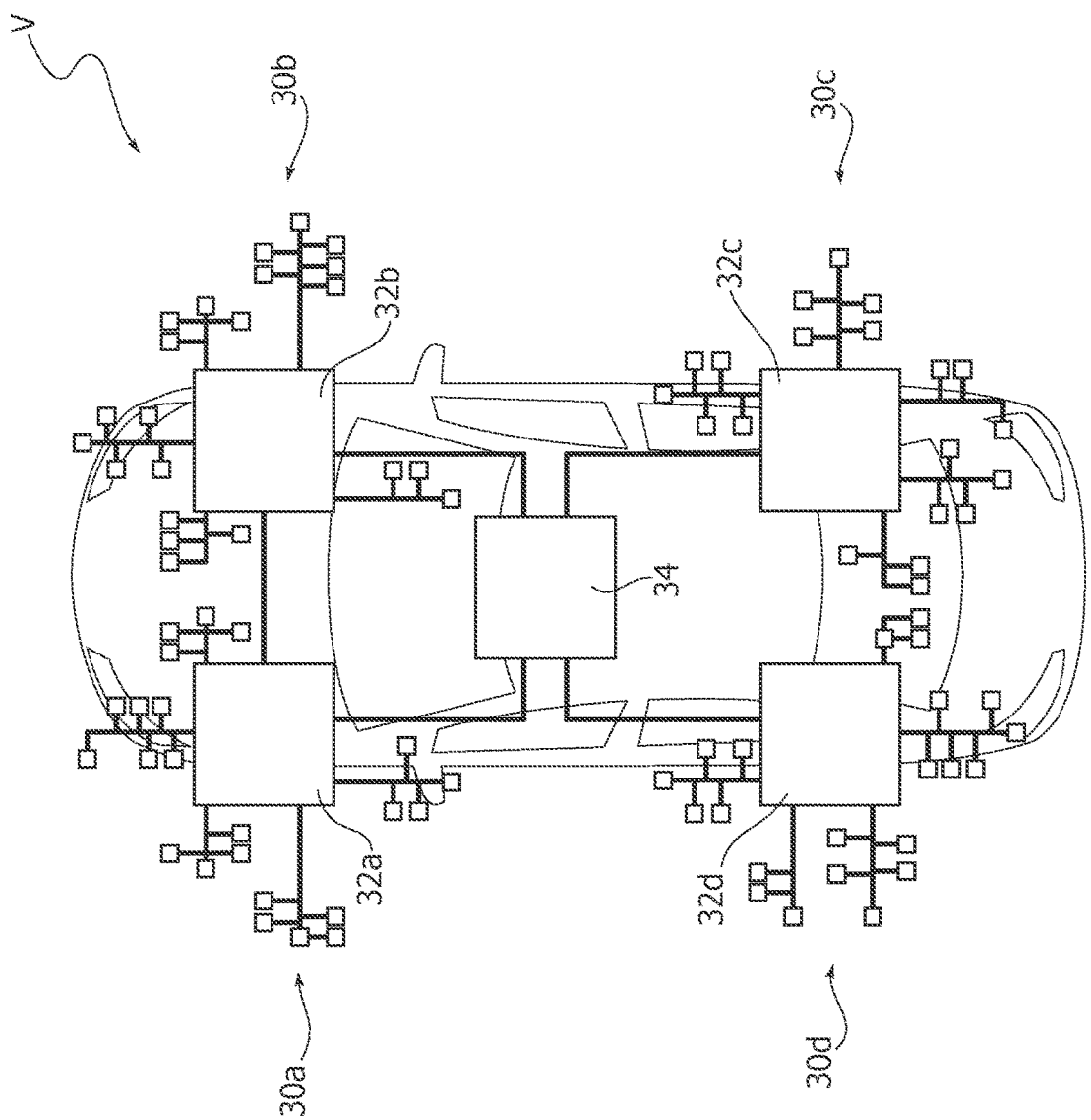
FIG. 3 is a simplified scheme exemplary of an automotive communication network having a zone-oriented architecture.

With reference to FIG. 2, each of the ECUs in groups 20a-20e could be assimilated to an ECU 44 as illustrated in FIG. 4, and any of the domain controllers 22a-22e could be assimilated to a controller 40 as illustrated in FIG. 4. With reference to FIG. 3, each of the ECUs in groups 30a-30d could be assimilated to an ECU 44 as illustrated in FIG. 4, and any of the zonal controllers 32a-32d could be assimilated to a controller 40 as illustrated in FIG. 4. Each ECU 44 is coupled to the respective controller 40 via a communication network 49 (e.g., a communication bus operating according to a CAN protocol, particularly a CAN FD protocol).

Therefore, each satellite ECU 44 (e.g., a door control unit, also referred to as a door zone device in the present description) includes a microcontroller 46 that is configured to "manage the intelligence" in the satellite application (e.g., receive, process and transmit signals). For instance, an ECU 44 may be configured to receive (CAN) frames from a controller 40 via the network 49, decode the received frames, determine the resulting operation to be carried out, and operate accordingly the driver circuits in the ECU 44 to drive the loads coupled to the ECU 44.

Additionally, the ECU 44 may be configured to sense operating parameters from the loads coupled thereto, determine that a frame (e.g., a diagnosis frame) has to be sent to the controller 40, encode the frame, and send the frame to the controller 40 via the network 49. Therefore, signal processing capabilities (or "intelligence") are provided in the ECUs 44 to control or monitor a plurality of loads by which the application is characterized. The term "or" meaning either or both.) For instance, as exemplified in FIG. 4, the loads coupled to the ECU 44 may include at least one of a window lift motor 401, an LED lighting device 402, an incandescent lighting device 403, a switch panel (or key pad) 404, and a heater device 405.

In one or more embodiments, the E/E architecture (be it domain-oriented or zone-oriented) can be improved by reducing such overhead of computational resources (e.g., the provision of microcontrollers 41 and 46 both in the domain/zonal controller 40 and in the satellite ECUs 44) as much as possible. For instance, as exemplified in FIG. 5, a domain-oriented or zone-oriented E/E architecture can be improved by consolidating (e.g., gathering, grouping) the computational resources needed by the application in a powerful, centralized domain or zonal controller 40' (e.g., a calculation cluster) and exchanging data with (e.g., addressing) the satellite ECUs 44' via an "intelligent" bus system 59, while the satellite ECUs 44' may include less computational resources compared to the current solutions. In other words, the "intelligence" of the E/E system is moved from the satellite ECUs to the domain or zonal controllers 40', while a smart connection bus is provided therebetween in order for the ECUs 44' to be able to operate even without an internal microcontroller, or with a low-end microcontroller (depending on the network topology and on the application). By doing so, redundant processing resources can be simplified or even removed, resulting in an improved Total Cost of Scale.

In one or more embodiments where the ECUs 44' are not provided with an internal microcontroller (or with a low-end one), the topology of the electrical connections to the electrical loads may also be revised and modified with respect to the topology exemplified in FIG. 4. In particular, the electrical loads may be partitioned in a first subset of loads (e.g., load 401) and a second subset of loads (e.g., loads 402 to 406) according to safety and timing requirements. For instance, the first subset may include one or more electrical loads that are to be driven according to safety-critical or time-critical requirements, such as a window lift motor 401 that is provided with a position estimation function and an anti-pinch function. The second subset may include one or more electrical loads that are not safety-critical or time-critical, such as a door lock, a switch panel or key pad, an electrochromic (EC) glass control device, a mirror glass control device, a heating device, or lighting devices, both LED and incandescent (see exemplary loads 402-406).

As exemplified in FIG. 5, the safety-critical or time-critical loads 401 may be directly driven by the domain or zonal controller 40' insofar as processing circuitry (e.g., programmable or non-programmable, the latter being possibly implemented by hardware such as a finite state machine, FSM) may be required for the control thereof, while the loads 402-406 that are not safety-critical or time-critical may be driven by the ECU 44' that only includes the corresponding driver devices but does not include a processor, insofar as the required signal processing is carried out by the controller 40' and the corresponding commands are issued towards the ECU 44' via the intelligent bus system 59.

Substantially, in one or more embodiments the time-sensitive or calculation-sensitive tasks are carried out in the controller 40' and the corresponding loads 401 are driven by direct wiring to the controller 40', whereas other loads 402-406 are controlled via the intelligent bus 59 and the ECUs 44'. The actuation and monitoring functions of loads 402-406 may be carried out by the satellite ECU 44' that is provided with some limited processing capability (e.g., a limited program or application 48', such as a light firmware or embedded software). In other words, the satellite ECUs may be "intelligent" to some extent but may not include a microcontroller, insofar as they are coupled to the controller 40' via the smart bus 59 and are provided with some limited processing circuitry 48'.

By way of example, the control of a power window motor 401 (or the control of any other motor requiring safety- and time-critical features like position detection and anti-pinch feature, such as power trunk lids or door closing applications) may rely on a flexible and programmable software to provide the proper support for certain safety features. Such a programmable signal processing capability may be too complex to be implemented in a satellite ECU 44' which is controlled by an intelligent bus 59 and is not provided with an internal microcontroller, so the control of the load 401 is transferred in the powerful controller 40' and is easily supported, insofar as only two wires are needed for direct drive of load 401 by controller 40'. Other loads 402-406 that also need programmability but are less safety- or time-critical can instead be controlled by the satellite ECU 44'.

Processing of the control signals addressed to such loads 402-406 or processing of the sensed feedback signals from such loads 402-406 is carried out in the controller 40' and supported by the intelligent bus 59. In this way, all loads 402-406 can be addressed by one bus and no direct signals (e.g., direct cables) are needed. The satellite ECUs 44' may be provided with limited processing capabilities in the form of some hardwired logic 48', but no complex programmable devices like a microcontroller are needed in the satellite ECUs 44'. Additional loads inside the satellite ECUs 44' not covered by the driver device can be addressed by a bus-to-SPI (or I2C, LIN, etc.) concept, in order to meet flexible application requirements and provide a scalable architecture.

Therefore, in one or more embodiments as exemplified in FIG. 5, a domain or zonal controller 40' may include a microcontroller 50 that runs a (relatively complex or heavy) program or application 52 (e.g., a firmware or embedded software) configured to control or monitor one or more electrical loads. The microcontroller 50 may issue command frames towards one or more ECUs 44' via a (smart) communication bus 59. The ECUs 44' may receive the command frames from the controller 40' via the bus 59 and may drive the loads 402-406 accordingly. The frames received by the ECUs 44' are not processed by an internal microcontroller, insofar as the received frames may be encoded in such a way that a simple logic circuit 48' in the ECUs 44' is able to produce the corresponding driving signals for the loads 402-406 without substantial computations having to be carried out in the ECUs 44'. Additionally, the ECUs 44' may receive feedback signals from the loads 402-406, and may encode (again in the simple logic circuit 48') corresponding frames to be sent to the controller 40' via the communication bus 59. Also in this case, encoding frames in the ECUs 44' may not involve processing by an internal microcontroller, and substantial computations in the ECUs 44' may be avoided.

Additionally, as exemplified in FIG. 5, the domain or zonal controller 40' may include further control and sensing circuitry 54 (which, in one or more embodiments, may be incorporated in the microcontroller 50) configured to directly control and monitor one or more loads 401 that are safety-critical or time-critical.

Figure 6:
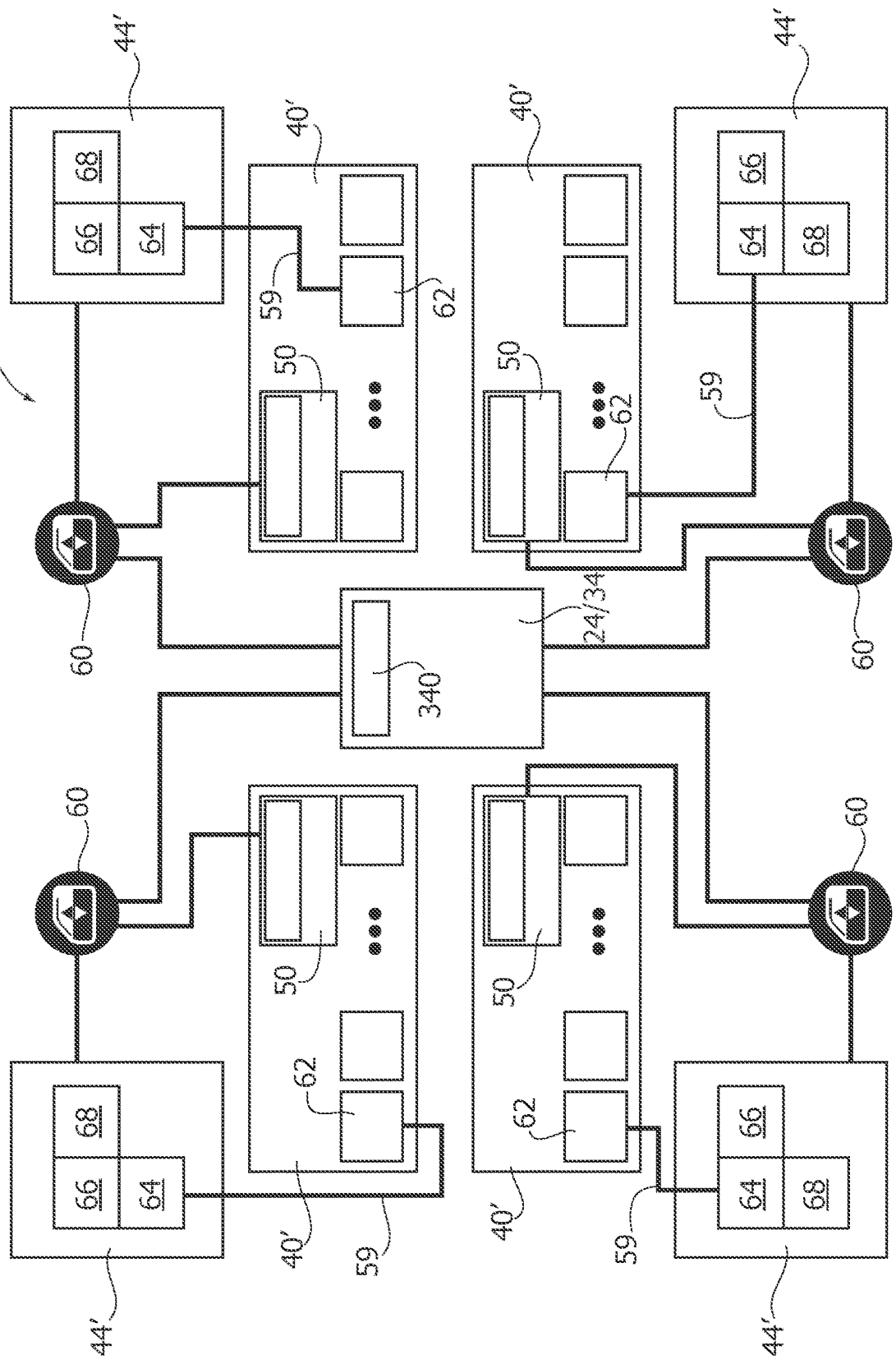
FIG. 6 is a block diagram exemplary of a communication network having a zone-oriented architecture, according to one or more embodiments of the present description.

FIG. 6 is a circuit block diagram exemplary of some components of an E/E domain-oriented or zone-oriented network of a vehicle V that rely on the solution disclosed herein. The network includes a central gateway 24 or central control unit 34 (see FIGS. 2 and 3), four domain controllers, zonal controllers or zonal gateways 40' (e.g., a front left controller, a front right controller, a rear right controller, and a rear left controller in the case of a zone-oriented architecture), and—by way of example—four satellite ECUs 44' (e.g., door zone devices 44' or door smart nodes 44' that are configured to control all the electronics of the respective door of vehicle V, again in the case of a zone-oriented architecture). Of course, in real applications the number of satellite ECUs or nodes 44' may be higher, as exemplified in FIGS. 2 and 3. Each door of the vehicle V includes a respective window lift motor 60, which is an example of a safety-critical and time-critical load.

As exemplified in FIG. 6, the central gateway or control unit 24/34 may include processing circuitry 340 configured to directly manage (e.g., control or monitor) the safety-critical and time-critical loads 60. For instance, the processing circuitry 340 may carry out ripple counting and run an anti-pinch algorithm. The central gateway or control unit 24/34 may be directly coupled to the loads 60 to directly manage them. Such direct coupling may be implemented via a communication bus (e.g., a mechatronic window is commanded via a LIN bus) or via power signals (e.g., a "normal" window lift motor powered by an H-bridge driver included in the central gateway or control unit 24/34).

Additionally, the central gateway or control unit 24/34 is coupled to the domain or zonal controllers 40'. Each controller 40' includes a respective microcontroller 50, which may also be configured to directly manage the safety-critical and time-critical loads 60 by carrying out ripple counting and running an anti-pinch algorithm. Therefore, also the controller 40' may be directly coupled to the loads 60 to directly manage them, again via a communication bus or via power signals. Additionally, each controller 40' includes at least one physical transceiver 62 configured for coupling to a satellite ECU 44' via a smart communication bus 59, e.g., a CAN FD Light bus.

Each satellite ECU 44' includes a transceiver 64 for coupling to the smart bus 59, a power management circuit 66, and drivers 68 for driving the loads coupled thereto (not visible in FIG. 6). Therefore, the microcontroller 50 of the controller 40' may be configured to manage the non-safety-critical or non-time-critical loads coupled to the satellite ECU 44' by exchanging signals via the bus 59. Additionally, as exemplified in FIG. 6, the satellite ECUs 44' may also be coupled to the loads 60 to manage them.

According to an example, the satellite ECU 44' (or smart node) is a door zone device that controls the electronics of a door of vehicle V. However, it will be understood that one or more embodiments may be applied to other body electronic application domains with similar requirements, like a trunk module, a sunroof control device, a sliding door control device, etc. Generally, as exemplified in FIG. 6, one or more embodiments rely on the fact of moving the processing circuitry from the satellite ECUs to the domain or zonal controllers 40'. This is facilitated by a networked architecture where the satellite ECUs are smart nodes that communicate with the controller 40' with a "command and response" scheme (e.g., resorting to the CAN FD Light protocol). For certain non-safety relevant functionalities, the satellite ECU 44' embeds an internal logic 48' able to interpret the commands received from the controller 40', reacting (e.g., responding) within a given timing (non-safety relevant control loop). In case of safety-relevant functionalities, the safety-relevant and high computation power control loops (e.g., for power window lift management) are instead located in the controller 40' (or even in the central gateway or control unit 24/34).

By way of example of a non-safety-relevant control loop, the use case of a door lock initiated by a local key pad is discussed herein.

In a conventional E/E architecture, where the door zone satellite device is provided with a local microcontroller, a door lock procedure could include the following steps:
  i) the user presses the lock button;
  ii) the door zone device communicates the event to the local microcontroller; the local microcontroller elaborates the event and sends internally a command to the driver of the door zone device for actuating the lock; and
  iii) the door zone device receives the command from the local microcontroller and actuates the lock motor via the respective driver.

Conversely, in an E/E architecture (be it domain-oriented or zone-oriented) according to one or more embodiments, where the door zone satellite device is not provided with a local microcontroller and the loads are managed by the controller 40', a door lock procedure may include the following steps:
  i) the user presses the lock button;
  ii) the door zone device is woken up to start communication with the domain or zonal controller;
  iii) the door zone device communicates the event to the domain or zonal controller, the microcontroller of the domain or zonal controller elaborates the event and sends a command to the door zone device for actuating the lock; and
  iv) the door zone device receives the command from the domain or zonal controller and actuates the lock motor via the respective driver.

Therefore, in one or more embodiments the communication between the satellite ECUs 44' and the controller 40' regarding non-safety-relevant control loops may rely on the use of a commander/responder network protocol (e.g., CAN FD Light), as such network protocols can provide maximum delay times (due to scheduling, which is not possible with the standard CAN protocol where arbitration takes place) that facilitate accurate and timely diagnosis, as well as a "wake-up by responder" feature. In particular, in one or more embodiments the communication between the satellite ECUs 44' and the controller 40' may rely on an improvement of the conventional CAN FD Light protocol, the improvement allowing for the responder devices to wake up the bus. In fact, this feature is not available in a conventional CAN FD Light bus where the responder nodes only act on CAN FD data frames received from commander nodes and do not arbitrate, so that one commander node controls the communication of the connected responder node(s).

Figure 7:
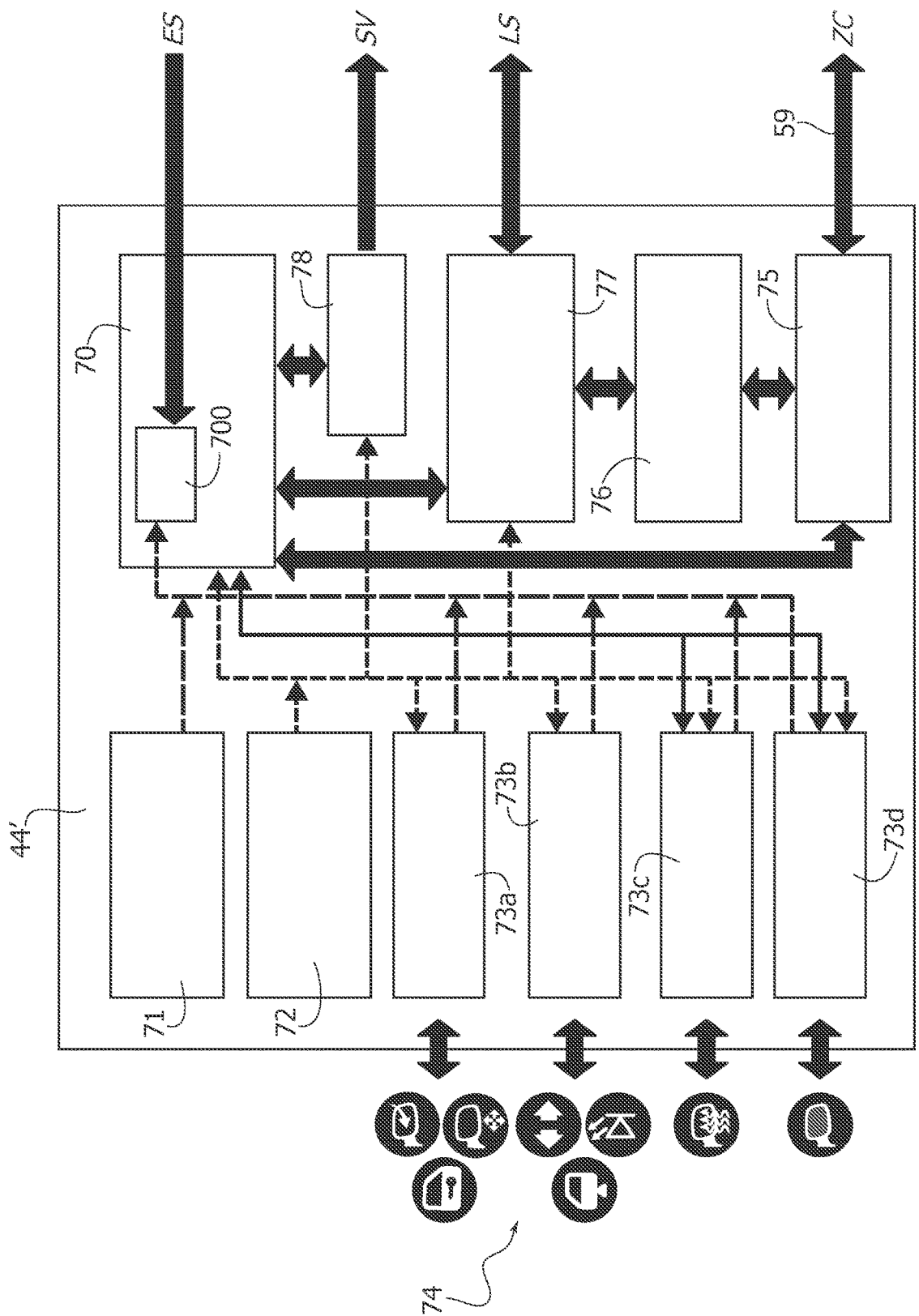
FIG. 7 is a block diagram exemplary of components of a responder device for use in a communication network having a zone-oriented architecture, according to one or more embodiments of the present description.

FIG. 7 is a circuit block diagram exemplary of a satellite device 44' according to one or more embodiments, which is configured to operate as discussed above, i.e., to implement a "wake-up by responder" feature when communicating with the corresponding controller 40' via an implementation of the CAN protocol, particularly of the CAN FD Light protocol.

As exemplified in FIG. 7, the satellite device 44' may include a digital core 70. The digital core carries out the logic processing functions 48' previously discussed to control the pre-drivers embedded in the satellite device (e.g., heater driver and electrochromic driver), and an analog-to-digital converter (ADC) 700 that receives external signals ES. The ADC is configured to convert external and internal analog signals used by the digital core to implement specific functionalities (e.g., potentiometer for mirror positioning, read back from an electrochromic device, supply voltage for LED PWM adjustment, etc.).

As exemplified in FIG. 7, the satellite device 44' may include internal analog signal generation circuitry 71, whose signals are received by the ADC 700.

As exemplified in FIG. 7, the satellite device 44' may include an analog core 72 that provides the central biasing, e.g., the voltage and current references for the drivers embedded in the satellite device and for the digital core 70.

As exemplified in FIG. 7, the satellite device 44' may include a plurality of load driver devices 73 (e.g., half-bridges 73a, high-side drivers 73b, drivers 73c for heating devices, drivers 73d for electrochromic devices) coupled to respective loads 74 (e.g., actuators coupled to the half-bridges 73a for actuating mirrors or locks; actuators coupled to the high-side drivers 73b for actuating lighting devices or window lift motors; a mirror heater coupled to the drivers 73c; an electrochromic mirror coupled to drivers 73d).

As exemplified in FIG. 7, the satellite device 44' may include a protocol handler 75 (e.g., a CAN FD Light protocol handler, configured to implement a "wake-up by responder" feature) coupled to the bus 59 to exchange signals ZC with the controller 40', a protocol translator 76 coupled to the protocol handler 75, and a serial protocol interface 77 coupled to the protocol translator 76. The protocol handler 75 is configured to extract the payload transmitted over the CAN bus 59 by the controller 40'. The extracted information is then passed to the protocol translator 76 (e.g., a CAN-to-SPI translator), which is configured to translate (e.g., decode) the bits of data coming from the protocol handler 75 into an already known SPI command (e.g., writing the control registers) and vice versa. When communicating in the other direction, when an information has to be sent to the controller 40', the protocol handler 75 is configured to build up and transmit the frame on the CAN bus 59. The serial protocol interface 77 (e.g., an SPI interface) is configured to communicate with a local SPI IS and to implement a commander/responder mechanism by which the drivers 73 can be configured; when communicating in the other direction, diagnostic data from the drivers 73 can be read by the serial protocol interface 77 and transmitted to the protocol handler 75.

As exemplified in FIG. 7, the satellite device 44' may include one or more voltage regulators 78 that provide supply voltage(s) SV to external sensors.

As discussed previously, in one or more embodiments the communication between the satellite ECUs 44' and the controller 40' via bus 59 may rely on the use of a CAN FD Light protocol that, additionally with respect to a conventional CAN FD Light protocol, implements a "wake-up by responder" feature.

A CAN FD Light protocol uses a commander-responder communication scheme. A CAN FD Light frame is based on the FD Base Frame Format Light (FBFF Light) and includes a Start-Of-Frame (SOF) bit, an arbitration field including a standard ID field (11 bits), a control field, a data field, a CRC field, an acknowledgment (ACK) field, and an End-Of-Frame (EOF) field.

In the CAN FD Light protocol, the commander may send all responders to sleep using a broadcast message in a single frame. A dedicated address indicates a broadcast message. Optional E2E protection bytes can be included for safety, at the beginning of the data field (after the control field). One command byte containing the "Go-to sleep" command (e.g., encoded as value "01H") is included in the data field (e.g., after the E2E protection bytes).

In the CAN FD Light protocol, the commander may also wake up the responders. Responder devices may detect the wake-up pattern according to specification ISO 11898-2: 2016, which specifies the time requirements (time constant) for a wake-up (WUP) filter Tfilter: 1.8 µs at 1 Mb/s, 5 µs at lower data rates (see ISO 11898-2:2016, Table 20). In particular, specification ISO 11898-2:2016 allows two wake-up indicators: a first one (defined in Chapter 5.9.2) is a basic wake-up, and defines that upon receiving once a dominant state for duration of at least Tfilter, a wake-up event shall happen; a second one (defined in Chapter 5.9.3) is a Pattern-Wake-Up ("Wake-Up-Pattern"—WUP), and defines that upon receiving two consecutive dominant states each for duration of at least Tfilter, separated by a recessive state with a duration of at least Tfilter, a wake-up event shall happen.

Selective wake-up may be optionally implemented. The commander sends a reserved frame containing the wake-up command (either basic or pattern), and additional data bytes fulfilling the wake-up requirements are optional (they may increase the detection probability in a very noisy environment). For instance, a possible wake-up pattern in a CAN FD Light frame may be the following:

| Standard ID | DLC | Data byte 1 | Data byte 2 ... 8 |
| --- | --- | --- | --- |
| 001_1110_0011 | 1000 | 1111_1110 | 0000_1111 |

A following wake-up frame may be used to wake-up devices implementing selective wake-up according to ISO 11898-2:2016. The wake-up frame is a CAN FD Light frame. Devices use a dedicated WUF-ID, several devices may be combined to one WUF-ID. For instance, a possible selective wake-up frame in a CAN FD Light frame may be the following:

| Standard ID | CTRL | CRC | ACK/EOF |
| --- | --- | --- | --- |
| "10", WUF ID[8:0] | | | |

In the CAN FD Light protocol, responder devices are controlled by the commander device. Normally, the commander device controls sleep and wake-up of all responder devices. Responder devices answer only to commander request, and they never initiate a communication, so that no arbitration is needed. In one or more embodiments according to a modified CAN FD Light protocol, the responder devices may instead wake-up the commander device. In that case, the responder device sends a wake-up frame (again, either basic or pattern) to the commander device. This is a case in which a responder device can initiate the communication on bus 59. As defined in the CAN protocol, a wake-up frame may include a single dominant pulse (logic zero—basic wake-up) or a sequence of dominant-recessive-dominant pulses (logic zero, logic one, logic zero—wake-up pattern). For instance, a possible wake-up pattern (from responder to commander) in a CAN FD Light frame may be the following, where the dominant-recessive-dominant pattern is included in the Standard ID:

| Standard ID | DLC | Data byte 1 | Data byte 2 . . . 8 |
|---|---|---|---|
| 000_1111_0000 | 1000 | 1111_1110 | 0000_1111 |

Since the CAN FD Light protocol does not provide for arbitration of the bus, giving to responders the possibility of initiating the communication on the bus may give rise to possible collisions, if more than one responder tries to wake-up the commander at the same time (using the same wake-up frame). Therefore, one or more embodiments may be specifically adapted to avoid or resolve collisions generated by the "wake-up by responder" additional feature implemented by CAN FD Light protocol. In particular, the responder devices may use mechanisms defined in the CAN FD Light Specification (CiA 604-1), even if not intended for wake-up collision avoidance.

In one or more embodiments, in order to avoid collisions generated by the "wake-up by responder" feature, the responders may take advantage of the "suspend transmission" state. In particular, the responder devices enter the "suspend transmission" state before sending the wake-up frame. In the "suspend transmission" state, the responder device monitors the bus for six bit-times; if a dominant bit (e.g., a start-of-frame) is detected, the responder device does not send a wake-up frame, because the bus is already active (woken up), insofar as another responder device, or the commander device, was faster in waking up the bus. If instead, during the "suspend transmission" state no dominant bit is detected, the responder device may determine that the bus is reasonably inactive, and may send the wake-up frame if necessary to wake up the bus.

Even if using the "suspend transmission" state, two or more responder devices may still send their (equal) wake-up frames at the same bit time, thus possibly generating a collision.

However, the maximum phase shift on the CAN bus is equal to one bit time. Therefore, the wake-up frame used by the responder devices may include pulses (e.g., a single dominant pulse if the basic wake-up is used, or a sequence of dominant-recessive-dominant pulses if the wake-up pattern is used) where the duration of each pulse is higher than the WUP filter time (Tfilter) plus one bit time. In this way, even in case of a collision with a possible overwriting of one bit per each pulse, the duration of the "remaining" portion of the pulses would be sufficient to be correctly detected.

For instance, if the CAN FD Light bus is operating at a data rate of 1 Mb/s, the bit time BT is equal to 1 μs. Since the time constant Tfilter for the wake-up (WUP) filter is equal to (or lower than) 1.8 μs when operating at 1 Mb/s, the duration of each pulse should be higher than Tfilter+BT=2.8 μs. Therefore, each pulse in the wake-up frame may include at least three consecutive bits (i.e., may have a duration of at least 3 μs when operating at 1 Mb/s). The graph below exemplifies a case of collision between the wake-up frames (in particular, using the wake-up pattern) transmitted by different responder devices, where the dominant bit value overwrites the recessive bit value, but the wake-up pattern is still detectable:

| WUP No. 1 | 0 | 0 | 0 | 1 | 1 | 1 | 0 | 0 | 0 | x |
|---|---|---|---|---|---|---|---|---|---|---|
| WUP No. 2 | x | 0 | 0 | 0 | 1 | 1 | 1 | 0 | 0 | 0 |
| Bus value | 0 | 0 | 0 | 0 | 1 | 1 | 0 | 0 | 0 | 0 |
| Duration | | 4 μs (D) | | | 2 μs (R) | | | 4 μs (D) | | |

According to another example, if the CAN FD Light bus is operating at a data rate of 500 kb/s, the bit time BT is equal to 2 μs. Since the time constant Tfilter for the wake-up (WUP) filter is equal to (or lower than) 5 μs when operating at a data rate lower than 1 Mb/s, the duration of each pulse should be higher than Tfilter+BT=7 μs. Therefore, each pulse in the wake-up pattern may include at least four consecutive bits (i.e., may have a duration of at least 8 μs when operating at 500 kb/s). The graph below exemplifies a case of collision between the wake-up frames (in particular, using the wake-up pattern) transmitted by different responder devices, where the dominant bit value overwrites the recessive bit value, but the wake-up pattern is still detectable:

| WUP No. 1 | 0 | 0 | 0 | 0 | 1 | 1 | 1 | 1 | 0 | 0 | 0 | 0 | x |
|---|---|---|---|---|---|---|---|---|---|---|---|---|---|
| WUP No. 2 | x | 0 | 0 | 0 | 0 | 1 | 1 | 1 | 1 | 0 | 0 | 0 | 0 |
| Bus value | 0 | 0 | 0 | 0 | 0 | 1 | 1 | 1 | 0 | 0 | 0 | 0 | 0 |
| Duration | | 10 μs (D) | | | | 6 μs (R) | | | 10 μs (D) | | | | |

Optionally, in one or more embodiments each pulse in the wake-up pattern may include at least four consecutive bits.

In one or more embodiments, a filter time Tfilter of 1.8 μs may be used at data rates higher than 500 kb/s, while a filter time Tfilter of 5 μs may be used at data rates lower than 500 kb/s.

Additionally or alternatively, possible collision issues related to the responder devices sending their wake-up frames at the same bit time may be solved by configuring different responder devices in the same network so as to use different lengths of the wake-up frame. In this way, if a collision initially occurs, the longer wake-up frame stays still on the bus and the remaining part, which may contain the wake-up pulse(s), may be detected by the other devices to wake up.

One or more embodiments may thus provide one or more of the following advantages: reducing the size and weight of the wiring harness in vehicles; reducing the complexity in hardware variances, thereby facilitating field-software updates; reducing the number of control units in a vehicle; or reducing the vehicle assembly costs because of the reduced harness complexity and because of the lower number of installed control units.

Without prejudice to the underlying principles, the details and embodiments may vary, even significantly, with respect to what has been described by way of example only, without departing from the extent of protection.

The extent of protection is determined by the annexed claims.

What is claimed is:

1. A vehicle communication network, comprising:
   a plurality of electronic control units arranged in a plurality of groups, wherein the electronic control units pertaining to the same group are coupled to each other via a respective dedicated communication bus operated according to a CAN protocol;

a plurality of local controllers, each local controller comprising a microcontroller unit and being coupled to a respective one of the groups of electronic control units via the respective dedicated communication bus to exchange CAN frames therewith;

a central controller coupled to the plurality of local controllers via a vehicle communication bus; and a first set of electrical loads, wherein each electrical load of the first set is coupled to one of the electronic control units to receive an actuation signal therefrom or provide a feedback signal thereto;

wherein each microcontroller unit of the local controllers is configured as a communication commander device to transmit and receive CAN frames via the respective dedicated communication bus; and wherein each of the electronic control units includes a respective logic circuit configured as a communication responder device to:

in response to a CAN frame being received from the respective local controller, decode the received CAN frame to produce the actuation signal for a respective electrical load; and in response to the feedback signal being received from the respective electrical load, transmit a CAN wake-up frame to the respective local controller and encode the feedback signal into a CAN frame for transmission to the respective local controller.

2. The vehicle communication network of claim 1, wherein the electronic control units do not comprise respective microcontroller units.

3. The vehicle communication network of claim 1, wherein:

the dedicated communication buses are operated according to a CAN FD protocol; and the local controllers exchange CAN FD frames with the respective group of electronic control units via the respective dedicated communication bus.

4. The vehicle communication network of claim 1, wherein:

the dedicated communication buses are operated according to a CAN FD Light protocol; and the local controllers exchange CAN FD Light frames with the respective group of electronic control units via the respective dedicated communication bus.

5. The vehicle communication network of claim 1, wherein each logic circuit of the electronic control units is configured to:

listen to the respective dedicated communication bus for a time interval having a duration of six bit times;

in response to a dominant bit being detected during the time interval, skip transmission of the CAN wake-up frame to the respective local controller; and in response to no dominant bits being detected during the time interval, transmit the CAN wake-up frame to the respective local controller.

6. The vehicle communication network of claim 1, wherein:

the CAN wake-up frame is transmitted by transmitting a dominant pulse or a sequence of a dominant pulse, a recessive pulse and a dominant pulse; and each of the dominant and recessive pulses has a duration higher than the sum of a CAN wake-up filter time and one bit time.

7. The vehicle communication network of claim 6, wherein each of the dominant and recessive pulses has a duration of at least three bit times.

8. The vehicle communication network of claim 6, wherein each of the dominant and recessive pulses has a duration of at least four bit times.

9. The vehicle communication network of claim 1, wherein:

the CAN wake-up frame is transmitted by transmitting a dominant pulse or a sequence of a dominant pulse, a recessive pulse and a dominant pulse; and each of the electronic control units is configured to repeat transmission of the CAN wake-up frame a number of times different from any other of the electronic control units.

10. The vehicle communication network of claim 1, wherein each of the electronic control units comprises a CAN protocol handler coupled to the respective dedicated communication bus, a protocol translator coupled to the CAN protocol handler, and a serial protocol interface coupled to the protocol translator.

11. The vehicle communication network of claim 10, wherein the CAN protocol handler is configured to extract a payload from the CAN frame received from the respective local controller, the protocol translator is configured to produce an SPI command as a function of the extracted payload, and the serial protocol interface is configured to transmit the SPI command to the respective electrical load.

12. The vehicle communication network of claim 10, wherein the serial protocol interface is configured to receive an SPI frame from the respective electrical load, the protocol translator is configured to produce a payload as a function of the SPI frame, and the CAN protocol handler is configured to build a CAN frame for transmission to the respective local controller including the payload.

13. The vehicle communication network of claim 1, wherein:

each of the local controllers comprises a respective CAN transceiver for coupling to the respective dedicated communication bus; and each of the electronic control units comprises a respective CAN transceiver for coupling to the respective dedicated communication bus.

14. The vehicle communication network of claim 1, wherein each of the electronic control units comprises a driver circuit coupled to one electrical load of the first set to provide the actuation signal thereto.

15. The vehicle communication network of claim 14, wherein each of the electronic control units comprises a sensing circuit coupled to one electrical load of the first set to receive the feedback signal therefrom.

16. The vehicle communication network of claim 1, wherein each of the electronic control units comprises a sensing circuit coupled to one electrical load of the first set to receive the feedback signal therefrom.

17. The vehicle communication network of claim 1, comprising a second set of electrical loads, wherein each electrical load of the second set is coupled to one of the local controllers to receive an actuation signal therefrom or provide a feedback signal thereto.

18. The vehicle communication network of claim 17, wherein each electrical load of the second set is further coupled to the central controller to receive an actuation signal therefrom or provide a feedback signal thereto.

19. A method of operating a vehicle communication network, wherein the vehicle communication network comprises:

a plurality of electronic control units arranged in a plurality of groups, wherein the electronic control units pertaining to the same group are coupled to each other via a respective dedicated communication bus operated according to a CAN protocol and wherein each of the electronic control units includes a respective logic circuit configured as communication responder device;

a plurality of local controllers, each local controller comprising a microcontroller unit and being coupled to a respective one of the groups of electronic control units via the respective dedicated communication bus to exchange CAN frames therewith;

a central controller coupled to the plurality of local controllers via a vehicle communication bus; and a first set of electrical loads, wherein each electrical load of the first set is coupled to one of the electronic control units;

wherein the method comprises:

receiving, at a first one of the electronic control units, a CAN frame from the respective local controller;

decoding the received CAN frame to produce an actuation signal for a respective electrical load;

receiving, at the first one of the electronic control units, a feedback signal from the respective electrical load; and in response to receiving the feedback signal, transmitting a CAN wake-up frame to the respective local controller and encoding the feedback signal into a CAN frame for transmission to the respective local controller.

20. The method of claim 19, wherein transmitting the CAN wake-up frame comprises:

listening to the respective dedicated communication bus for a time interval having a duration of six bit times; and transmitting the CAN wake-up frame to the respective local controller in response to no dominant bits being detected during the time interval, transmission of the CAN wake-up frame is skipped when a dominant bit is detected during the time interval.

21. The method of claim 19, wherein transmitting the CAN wake-up frame comprises transmitting a dominant pulse or a sequence of a dominant pulse, a recessive pulse and a dominant pulse, each of the dominant and recessive pulses having a duration higher than the sum of a CAN wake-up filter time and one bit time.

22. The method of claim 19, wherein transmitting the CAN wake-up frame comprises transmitting a dominant pulse or a sequence of a dominant pulse, a recessive pulse and a dominant pulse, the transmitting being repeated a number of times different from any other of the electronic control units.

23. The method of claim 19, further comprising:

extracting, by the first one of the electronic control units, a payload from the CAN frame received from the respective local controller;

producing, by the first one of the electronic control units, an SPI command as a function of the extracted payload; and transmitting, by the first one of the electronic control units, the SPI command to the respective electrical load.

24. The method of claim 19, further comprising:

receiving, by the first one of the electronic control units, an SPI frame from the respective electrical load;

producing, by the first one of the electronic control units, a payload as a function of the SPI frame; and building, by the first one of the electronic control units, a CAN frame for transmission to the respective local controller including the payload.

* * * * *